United States Patent
Karame et al.

(10) Patent No.: US 10,311,594 B2
(45) Date of Patent: Jun. 4, 2019

(54) METHOD FOR VERIFYING POSITIONS OF A PLURALITY OF MONITORING DEVICES

(71) Applicant: NEC Europe Ltd., Heidelberg (DE)

(72) Inventors: Ghassan Karame, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 15/522,295

(22) PCT Filed: Oct. 30, 2014

(86) PCT No.: PCT/EP2014/073358
§ 371 (c)(1),
(2) Date: Apr. 27, 2017

(87) PCT Pub. No.: WO2016/066203
PCT Pub. Date: May 6, 2016

(65) Prior Publication Data
US 2017/0316574 A1    Nov. 2, 2017

(51) Int. Cl.
*G06T 7/70* (2017.01)
*H04N 7/18* (2006.01)
*G08B 13/196* (2006.01)
*G08B 29/00* (2006.01)

(52) U.S. Cl.
CPC .......... *G06T 7/70* (2017.01); *G08B 13/19645* (2013.01); *G08B 13/19667* (2013.01); *G08B 29/00* (2013.01); *H04N 7/18* (2013.01); *H04N 7/181* (2013.01)

(58) Field of Classification Search
CPC . G06T 7/70; H04N 7/181; H04N 7/18; G08B 13/19667; G08B 29/00; G08B 13/19645
See application file for complete search history.

(56) References Cited

U.S. PATENT DOCUMENTS

| | | | |
|---|---|---|---|
| 2007/0140487 A1* | 6/2007 | Meier | H04N 7/1675 380/201 |
| 2015/0134552 A1* | 5/2015 | Engels | H04W 4/80 705/318 |

OTHER PUBLICATIONS

Anonymous: "Challenge-response authentication—Wikipedia, the free encyclopedia", Sep. 7, 2012 (Sep. 7, 2012), XP055101700.

* cited by examiner

*Primary Examiner* — Tat C Chio
(74) *Attorney, Agent, or Firm* — Leydig, Voit & Mayer, Ltd.

(57) ABSTRACT

A method for verifying positions of a plurality of monitoring devices includes selecting a second monitoring device by a first monitoring device. A first number of monitoring devices out of the plurality of monitoring devices is supervised, the plurality of monitoring devices being positioned such that each monitoring device of the plurality of monitoring devices can be monitored by at least one other monitoring device of the plurality of monitoring devices. Correct positions of the plurality of monitoring devices have been determined and stored prior to verification, and security information for secure communication has been exchanged between two of the plurality of monitoring devices for all of the plurality of monitoring devices.

15 Claims, 2 Drawing Sheets

METHOD FOR VERIFYING POSITIONS OF A PLURALITY OF MONITORING DEVICES

CROSS REFERENCE TO RELATED APPLICATIONS

This application is a U.S. National Stage application under 35 U.S.C. § 371 of International Application No. PCT/EP2014/073358 filed on Oct. 30, 2014. The International Application was published in English on May 6, 2016 as WO 2016/066203 A1 under PCT Article 21(2).

FIELD

The present invention relates to a method for verifying positions of a plurality of monitoring devices N, preferably cameras, wherein a first number of monitoring devices n out of all monitoring devices N is supervised.

The present invention further relates to a system for verifying positions of a plurality of monitoring devices N, preferably cameras, wherein a first number of monitoring devices n out of all monitoring devices N is supervised.

BACKGROUND

Device security is gaining increasing importance nowadays. Mobile devices should be secure. Conventional methods establish, e.g., a static route of trust and/or dynamic route of trust in various computing environments. As shown in the following non-patent literature:
"Bootstrapping Trust in Commodity Computers.", B. Parno, J. M. McCune, A. Perrig, IEEE S&P 2010;
"OSLO: Improving the security of Trusted Computing", Bernhard Kauer; Trusted Computing Group http://www.trustedcomputinggroup.org;
IBM 4758 Basic Services Manual: http://www-03.ibm.com/security/crypto-cards/pdfs/IBM_4758_Basic_Services_Manual_Release_2_54.pdf;
Kalman, G., Noll, J., UniK, K.: SIM as secure key storage in communication networks, in: International Conference on Wireless and Mobile Communications (ICWMC) (2007);
Noll, J., Lopez Calvet, J. C., Myksvoll, K.: Admittance services through mobile phone short messages. In: International Multi-Conference on Computing in the Global Information Technology. pp. 77-82. IEEE Computer Society, Washington, D.C., USA (2006);
Mantoro, T., Milisic, A.: Smart card authentication for Internet applications using NFC enabled phone. In: International Conference on Information and Communication Technology for the Muslim World (ICT4M) (2010) and
IBM Integrity Measurement Architecture, http://researcher.watson.ibm.com/re-searcher/view_project.php?id=2851.
Either it is attested that an untrusted environment can provide some security guaranties and/or a trusted sub-environment within an untrusted computing environment is created.

However, these conventional methods nevertheless allow attacks on devices which are not necessary software-based or hardware-based. For example when challenging attacks on monitoring cameras an "abducting" of the camera itself can be performed and the camera view can be replaced with a static picture matching to the original location of the camera. One of the problems is that such an attack is hard to deter by using conventional software-based or hardware-based attestation techniques. One conventional solution to protect against camera abduction is to rely on a GPS being installed at the camera and which is secured and measured by a trusted platform module TPM. However, one of the disadvantages is, that most existing monitoring cameras are not equipped with a GPS system and therefore would cause costly hardware updates.

These disadvantages are addressed to securely position monitoring cameras by authenticating them using a visual channel as communication medium and without relying a GPS receiver in the non-patent literature of:
Srdjan Capkun and Jean Pierre Hubaux, "Secure Positionning in Wireless Networks", IEEE JOURNAL ON SELECTED AREAS IN COMMUNICATIONS, VOL. 24, NO. 2, February 2006;
Nitesh Saxena, Secure Device Pairing based on a Visual Channel, 2006, Available from http://eprint.iacr.org/2006/050.pdf and
Joe Albowicz, Alvin Chen, Lixia Zhang, Recursive Position Estimation in Sensor Networks, Proceedings of ICNP '01 Proceedings of the Ninth International Conference on Network Protocols, 2001

However, one of the disadvantages of these conventional methods is, that these methods are either complicated and/or have only a low level of security.

SUMMARY

In an embodiment, the present invention provides a method for verifying positions of a plurality of monitoring devices, wherein a first number of monitoring devices out of the plurality of monitoring devices is supervised, wherein the plurality of monitoring devices are positioned such that each monitoring device of the plurality of monitoring devices can be monitored by at least one other monitoring device of the plurality of monitoring devices, wherein correct positions of the plurality of monitoring devices have been determined and stored prior to verification, and wherein security information for secure communication has been exchanged between two of the plurality of monitoring devices for all of the plurality of monitoring devices. The method includes selecting a second monitoring device (SMD) by a first monitoring device (FMD) within the maximum monitoring range of the FMD; and mutually authenticating the FMD and the SMD by exchanging challenge-response messages based on a chained secure challenge-response authentication protocol between the SMD and the FMD using a monitoring capability of the FMD or the SMD for receiving and using a transmitter of the FMD or the SMD for sending such that messages sent by the transmitter of the FMD or the SMD can be received by the monitoring capability of the other of the FMD or the SMD. The exchanging challenge-response messages based on a chained secure challenge-response authentication protocol includes generating a response to a received challenge from the FMD to the SMD and sending the response as a new challenge for the FMD by the SMD based on the received challenge and vice versa. A time is measured between an emission of a challenge and a reception of a response to the challenge by the FMD and the SMD. A first overall time is determined as a sum of all times measured by the FMD and a second overall time is determined as a sum of all times measured by the SMD. Part of each message received by the FMD and the SMD is extracted. Each part extracted by the FMD is verified. The parts extracted by the SMD are cumulated and the cumulated parts are verified by the SMD after all messages have been exchanged with information of a cryptographic one-way function provided by the FMD to the SMD. The first overall time and the second overall time are compared with predetermined correct overall times. Authentication fails if the result of at least one of the steps b5)-b7) is negative. The method further includes measuring a relative position of the successfully authenticated FMD and the successfully authenticated SMD to each other; performing steps a)-c) for each of the plurality of monitoring devices until relative positions of all of the plurality of monitoring devices to each other have been measured or until an authentication has been failed; determining absolute positions of all of the plurality of monitoring devices using two supervised monitoring devices; and verifying the positions by matching the determined absolute positions with the corresponding stored predetermined correct absolute positions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
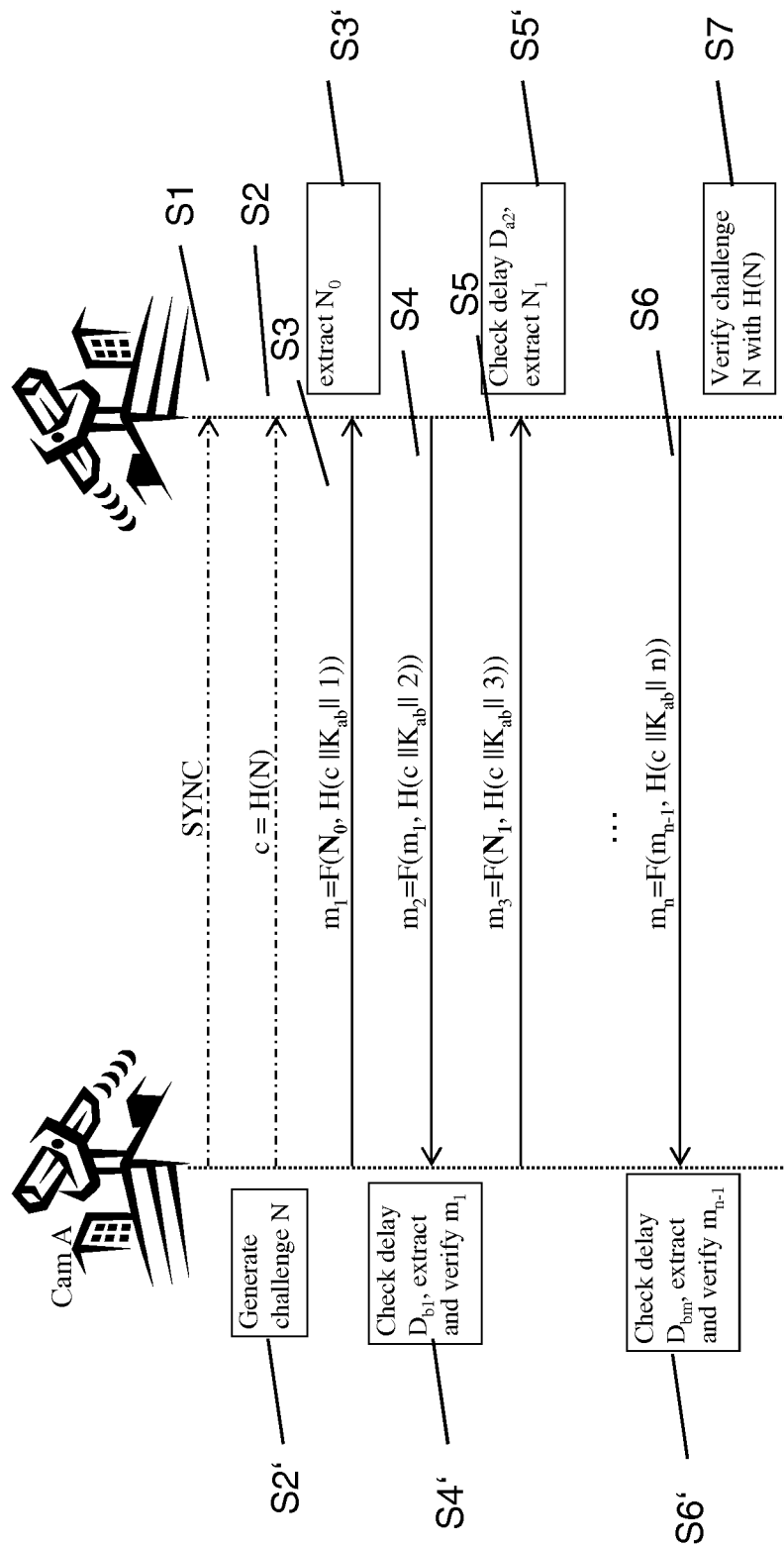
FIG. 1 shows part of a method according to a first embodiment of the present invention.

Although applicable to monitoring devices in general the present invention will be described with regard to cameras as monitoring devices.

A method and a system for verifying positions of a plurality of monitoring devices are provided herein that enhance efficiency when securely position monitoring devices.

A method and a system for verifying positions of a plurality of monitoring devices are provided herein that do not rely on hardware-based positioning systems like GPS, GLONASS or the like avoiding costly hardware or hardware updates.

A method and a system are provided herein for verifying positions of a plurality of monitoring devices that are easy to implement while rendering more difficult any attack on the positioning.

According to an embodiment, a method is provided for verifying positions of a plurality of monitoring devices N, preferably cameras, wherein a first number of monitoring devices n out of all monitoring devices N is supervised, and wherein the monitoring devices—MD—are positioned such that for each MD an MD can be monitored by at least one, preferably at least two other MD, and wherein correct positions of the MD have been determined and stored prior to verification, and wherein security information for secure communication has been exchanged between two MD for all MD, is defined.

According to the embodiment, the method includes the steps of:
a) Selecting a second MD—SMD—by a first MD—FMD—within the maximum monitoring range of said FMD,
b) Mutual authenticating said FMD and SMD by exchanging challenge-response messages based on a chained secure challenge-response authentication protocol between said SMD and FMD using the monitoring means of the monitoring devices for receiving and using sending means of the monitoring devices for sending such that messages sent by a sending means of a MD can be received by monitoring means of another MD, wherein
  b1) said chaining is provided by generating a response to a received challenge from said FMD to said SMD and sending it as a new challenge for the FMD by the SMD based on the received challenge and vice versa, and wherein
  b2) a time is measured between the emission of a challenge and the reception of a response to the challenge by the FMD and SMD, and wherein
  b3) the first overall time as a sum of all times measured by the FMD and the second overall time as a sum of all times measured by the SMD is determined and wherein
  b4) part of each message received by the FMD and SMD is extracted and wherein
  b5) each part extracted by the FMD is verified and wherein
  b6) the parts extracted by the SMD are cumulated and the cumulated parts are verified by the SMD after all messages have been exchanged with information of a cryptographic one-way function provided by the FMD to the SMD, and wherein
  b7) the first and second overall time are compared with predetermined correct overall times, and wherein
  b8) authentication fails if the result of at least one of the steps b5)-b7) is negative,
c) Measuring the relative position of the successfully authenticated FMD and SMD to each other,
d) Perform steps a)-c) for each MD until for all MDs their relative position to each other has been measured or an authentication has been failed,
e) Determining the absolute positions of all MD using two supervised MD,
f) Verifying the positions by matching the determined absolute positions with the corresponding stored predetermined correct absolute positions.

According to an embodiment, a system is provided for verifying positions of a plurality of monitoring devices N, preferably cameras, wherein a first number of monitoring devices n out of all monitoring devices N is supervised, and wherein the monitoring devices—MD—are positioned such that for each MD an MD can be monitored by at least one, preferably at least two other MD, and wherein correct positions of the MD have been determined and stored prior to verification, and wherein security information for secure communication has been exchanged between two MD for all MD, is defined.

According to the embodiment, the system includes:
a) A first MD—FMD—is adapted to select a second MD—SMD—within the maximum monitoring range of said FMD,
b) said FMD and SMD are adapted to mutually authenticate each other, wherein said FMD and said SMD are adapted to exchange challenge-response messages based on a chained secure challenge-response authentication protocol between themselves using the monitoring means of the monitoring devices for receiving and using sending means of the monitoring devices for sending such that messages sent by a sending means of a MD can be received by monitoring means of another MD, wherein
  b1) said chaining is provided by generating a response to a received challenge from a FMD to a SMD and sending it as a new challenge for the FMD by the SMD based on the received challenge and vice versa, and wherein b2) the FMD and the SMD are adapted to measure a time between the emission of a challenge and the reception of a response to the challenge, and wherein b3) the FMD is adapted to measure the first overall time as a sum of all times measured and the SMD is adapted to determine the second overall time as a sum of all times measured by the SMD and wherein b4) the FMD and the SMD are adapted to extract part of each message received by the FMD or SMD and wherein b5) the FMD is adapted to verify each part extracted by the FMD and wherein b6) the SMD is adapted to cumulate the parts extracted by the SMD and to verify the cumulated parts after all messages have been exchanged with information of a cryptographic one-way function provided by the FMD to the SMD, and wherein b7) the FMD and the SMD respectively are adapted to compare the first and second overall time respectively with predetermined correct overall times, and wherein b8) the FMD and the SMD are adapted to determine a failed authentication if the result of at least one of b5)-b7) is negative, c) the successfully authenticated FMD and the successfully authenticated SMD are adapted to measure the relative position to each other, d) each MD is adapted to perform steps a)-c) until for all MDs their relative position to each other has been measured or an authentication has been failed, e) two supervised MD are adapted to determine the absolute positions of all successfully authenticated MD, f) a verifying entity is adapted to verify the positions by matching the determined absolute positions with the corresponding stored predetermined correct absolute positions.

According to embodiments of the invention it has been recognized that in an effective and secure way monitoring devices can be positioned by authenticating them using bi-directional communication between them and using a challenge-response protocol.

According to embodiments of the invention it has been further recognized that any attack is considerably hardened on the positioning of monitoring devices.

According to embodiments of the invention it has been even further recognized that the position can be securely verified without relying on a satellite navigational system like GPS, GLONASS or the like.

According to embodiments of the invention it has been even further recognized that authentication is leveraged and the locations of the monitoring devices are securely positioned.

Embodiments of the present invention provides secure mutual authentication of monitoring devices using bi-directional communication channels using the type of monitoring, e.g. visual sending and capture by means of a chained challenge response key-based protocol. This chained challenged response key-based protocol enables to securely position the location of the monitoring devices.

According to a preferred embodiment if an authentication according to step b8) fails, an alarm is raised. This ensures that immediately after a monitoring device cannot be authenticated, an alarm is raised, so that a verifier can physically check whether the monitoring device has only a technical failure or was moved or being attacked.

According to a further preferred embodiment messages are exchanged via sending and monitoring means using optical communication, preferably using visual communication, preferably wherein the sending means are adapted to modulate a visual signal. This avoids transmission, for example via the internet to which an attacker may get access to from any worldwide position. By using optical communication means in the at least indirect line of sight it is ensured that an attacker must be in physical range of the monitoring devices to initiate an attack. Of course sending and monitoring means could be also based on acoustic waves, etc. Optical communication may be performed in the infrared, visual and/or ultraviolet frequency range. In particular it is possible that sending is performed in the infrared range, where as receiving; i.e. monitoring is also performed in the visual range, etc. . . . . .

According to a further preferred embodiment the chained secure challenge-response authentication according to step b) is performed in a bit-by-bit manner. This ensures a fast and efficient way for a chained challenge-response authentication.

According to a further preferred embodiment prior to step b) a pre-agreed synchronization message is sent to the SMD by the FMD to trigger initiation of the authentication. This enables in an efficient way that for example a first camera decides to position a second camera. Such a pre-agreed synchronization message can for example be achieved by turning all LEDs of the first monitoring device on for two seconds.

According to a further preferred embodiment for performing step b) a random challenge nonce is generated and a commitment of said nonce is provided by the FMD to the SMD. By using a random challenge nonce a randomly generated and defined challenge is provided. By providing the commitment of said nonce to the SMD the SMD can verify if the collected and accumulated parts of the message correspond to the commitment and therefore if this mutual authentication was successful.

According to a further preferred embodiment for performing step b) a first message comprising the result of a function computed by the FMD over a part of the nonce and a result of a cryptographic one way function over at least the security information and the commitment is sent to the SMD, wherein the parts of the nonce in different messages are different. This ensures that the SMD can extract part of the message and without the shared security information the SMD fails the authentication immediately in response of the first message.

According to a further preferred embodiment a second message is sent to the FMD by the SMD, said second message comprising a result of said function computed by the SMD over said received message and a result of cryptographic one way function over at least the security information and the commitment. This ensures that the FMD fails the authentication at the end of step b) when the SMD verifies the commitment.

According to a further preferred embodiment the function is non-linear, preferably performing a XOR operation. This ensures in an efficient way provision of a function which can be reverted by the monitoring devices.

According to a further preferred embodiment the said nonce is divided into parts, preferably provided in form of a plurality of bits and the number of messages exchanged during step b) corresponds to the number of parts, preferably bits of the nonce. For example a part of a message extracted by the SMD is simply the first bit of the nonce and in the further messages generated by the FMD and sent to the SMD the other bits of the nonce are subsequently used.

According to a further preferred embodiment an expansion function is used for the parts of the nonce when used as input for said function. This ensures that for example when used as input to the function F the bits 1 and 0 are replaced by a bit string having the same length as a hash function output. Therefore compatibility for performing the operation of the function is ensured.

According to a further preferred embodiment in step b5) the FMD extracts the first message received in the second message by reverting said function and verifies the extracted first message. This enables in an efficient way to verify the extracted parts by the FMD.

According to a further preferred embodiment in step b6) the parts extracted by the SMD, preferably bit-wise parts of the nonce, are concatenated by the SMD and used as input for the cryptographic one way function, which result is compared with the commitment provided by the FMD to the SMD. This allows in an easy way to verify the accumulated parts after all messages of the chained authentication procedure have been exchanged.

According to a further preferred embodiment the correct times are calculated at least based on the correct distance between two MD and their processing capabilities for receiving, processing and emitting a response to a received message. This enables to determine correct times with sufficient precision. Further, deviations from that correct times may be included into the correct times, for example in form of intervals where an attack is detected or not.

FIG. 1 shows part of a method according to a first embodiment of the present invention.

In FIG. 1 an illustration of a chained challenge response protocol for secure positioning is shown. All messages except for the first two are sent via a visual channel by signal modulation.

In the following it is assumed that the monitoring devices in form of cameras are installed in such a way that a subset of the cameras have a direct view on parts of the other camera. More specifically it is assumed that each camera A, B is monitored by these two other cameras.

At the start of the protocol, a camera A decides to position a camera B. For that purpose, the camera A starts in a first step S1 by sending a pre-agreed synchronization message SYNC, e.g., this could be achieved by turning all LEDs for 2 seconds. Then, the camera A picks a random challenge nonce N in a further step S2' and sends a commitment of N (e.g., using a one way cryptographic hash function of N) to camera B in a further step S2. Then, camera A will compute a function F, e.g., XOR over each bit of the challenge with the first hash of secret $K_{ab}$, and sends the result to camera B in a further step S3. Upon reception of the message from camera A, camera B computes function F over the received message with its secret, e.g., XOR with the second hash of the secret and sends it to camera A in a further step S4. Then camera A continues the chained challenge response protocol by applying F over the received message with the third hash of its secret and the third bit of the challenge in a further step S5 and so on. Here, we define the $i^{th}$ hash of a message M as follows: H(M||i), where || denotes message concatenation.

During the chained challenge response protocol, each camera A, B will check if the response delay $D_{b1}, D_{a2}, D_{b2}$, . . . is within reasonable time bounds, for both individual delay of each round $D_{b1}, D_{a2}, D_{b2}$, in steps S2', S3', S4', S5', S6' and accumulated delay $D_{sum}$ of all occurred rounds. If not, the camera A aborts the protocol and raises an alarm. Once n rounds of the challenge response protocol complete, camera B verifies all the bits of the challenge extracted from the messages $m_1, m_3, \ldots$ in steps S3', S5', . . . against the commitment c of the challenge in a further step S7. If all checks are verified, then both cameras A, B authenticate each other and use the obtained frames, i.e. captured picture frames via visual means to construct a measurement of the position of the other camera B, A with respect to their own location. This process is shown in FIG. 1.

In more detail, FIG. 1 shows a concrete instantiation of an authentication protocol according to an embodiment of the present invention. Here, F is a non-linear function instantiated as a block cipher with a known key. H is a one way cryptographic hash function such as SHA-1. $N_i$ is the $i^{th}$ bit of the challenge N. When used as input to the function F, bits 1 and 0 are first replaced by a bit string with the same length as the hash function output e.g. by using an expansion function. All messages are sent through the visual channel, i.e., the sender modulates the message to LED blinking signals that can be captured and demodulated by the receiver, except for the first two messages corresponding to steps S1 and S2 that can be sent through other channels such as a network, e.g. the internet. Without the shared secret key, Camera B fails the authentication immediately in the response of the first round; Camera A will fail the authentication at the end of the protocol when Camera B verifies with the commitment c. Each camera A, B can detect the Man-in-the-middle-attack through the check of the delay $D_{b1}, D_{a2}, D_{b2}, \ldots$.

This chained challenge response protocol hardens against an adversary which performs a man-in-the-middle attack on the authentication protocol. Indeed, when assuming an adversary being equipped with a device capable of capturing the blinking sequences and of replaying them with a delay D the n chained challenge response protocol ensures that even if the delay D introduced when performing a man-in-the-middle attack is not enough to detect the attack, then the overall protocol, i.e., after n iterations would incur nD delay, which should facilitate detecting the attack.

The encoding of bits in the visual channel can be performed by LEDs which can emit different colors and infrared light. This increases further the costs of an attack device being capable of performing a man-in-the-middle attack on the authentication protocol.

In an additional embodiment the position of an unsupervised monitoring device can be interpolated using a single supervised monitoring device if the supervised monitoring device is static and knows the entire topology of its surroundings.

Figure 2:
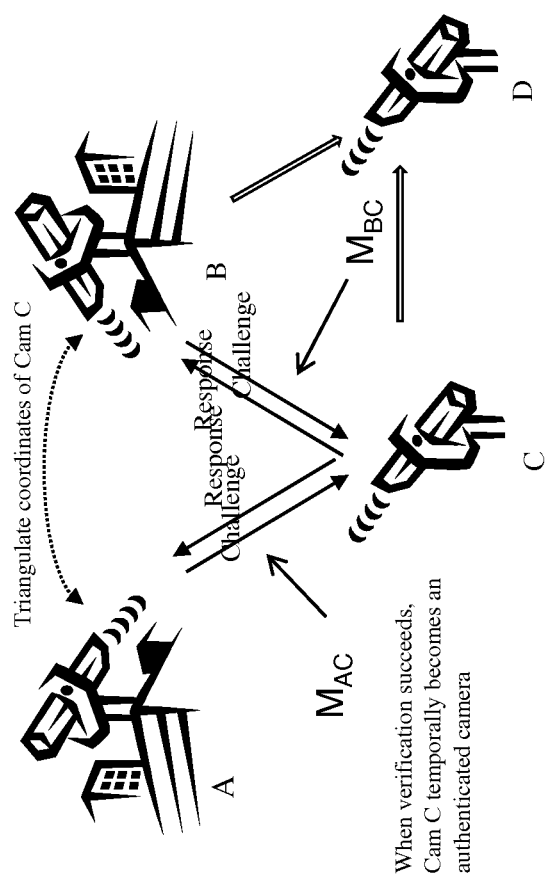
FIG. 2 shows part of a system according to a second embodiment of the present invention.

FIG. 2 shows part of a system according to a second embodiment of the present invention.

In FIG. 2 a sketch of the secure positioning technique based on mutual authentication using challenge response in the visual channel is shown. After performing the mutual authentication of camera A and camera B according to FIG. 1 this process is re-iterated until all cameras A, B, C, D have acquired the relative position of the cameras within the visual range.

Then, the cameras A, B, C, D transmit over the Internet, or using the visual channel, the coordinates that they acquired from the other cameras A, B, C, D that they authenticated. The cameras A, B, C, D can then interpolate the location of all other cameras A, B, C, D using several coordinates obtained from the other cameras A, B, C, D. If the locations of the camera A, B, C, D itself or of other cameras A, B, C, D do not match the location stored in the camera memory, then all cameras A, B, C, D will send an alarm signal, e.g. using any communication medium.

In summary, one or more embodiments of the present invention may provide the following advantages: One or more embodiments of the present invention can make a man-in-the-middle attack on a positioning system extremely challenging for an adversary:

Since a chained challenge response protocol is used derived from secrets being only known to the monitoring devices A, B, C, D an adversary has to employ sophisticated devices to relay signals in very small delays. Thus to break each authentication protocol the adversary is forced to invest in hardware that is more computationally capable then the monitoring devices themselves.

Since the present invention preferably relies preferably on bi-directional visual channels as communication means an adversary should be physically present in all links in order to break the positioning. Otherwise if an adversary attacks all communication links but one it is sufficient for one monitoring device to detect that there is something wrong and then an alarm is raised and the attack will be immediately detected.

One or more embodiments of the present invention can enable secure mutual authentication of monitoring devices like cameras or the like using bi-directional visual channels by means of a chained challenge response key-based protocol. Further embodiments of the present invention can leverage said authentication protocol in order to securely position the location of monitoring devices within a network.

One or more embodiments of the present invention can further effectively and securely positions monitoring devices like cameras by authenticating them using visual channels as a communication medium without relying on a GPS receiver or the like.

A method for securely position a plurality of monitoring devices like cameras according to an embodiment of the present invention includes the following steps:

1) Each monitoring device (the measurer) uses its estimate and tries to locally estimate the position of other monitoring devices within visual reach.
2) Establishing a secure bit by bit challenge-response authentication protocol to each of the monitoring devices to securely determine that the monitoring device is authentic.
3) Use the acquired captured data like video frames of a monitoring device to determine using one degree of freedom the position of the measured monitoring device.
4) Exchange the position of all measured monitoring devices with every authenticated monitoring device.
5) Using at least one additional measurement (in addition to own measurement) from an authenticated monitoring device in order to securely position the location of authenticated monitoring devices whose location is not known to the measurer.
6) If the measurer finds out that the location of any of the measured monitoring devices does not match the stored monitoring device network topology, the measurer will raise an alarm.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for verifying positions of a plurality of monitoring devices, wherein a first number of monitoring devices out of the plurality of monitoring devices is supervised, wherein the plurality of monitoring devices are positioned such that each monitoring device of the plurality of monitoring devices can be monitored by at least one other monitoring device of the plurality of monitoring devices, wherein correct positions of the plurality of monitoring devices have been determined and stored prior to verification, and wherein security information for secure communication has been exchanged between two of the plurality of monitoring devices for all of the plurality of monitoring devices, the method comprising:
   a) selecting a second monitoring device (SMD) by a first monitoring device (FMD) within the maximum monitoring range of the FMD,
   b) mutually authenticating the FMD and the SMD by exchanging challenge-response messages based on a chained secure challenge-response authentication protocol between the SMD and the FMD using a monitoring capability of the FMD or the SMD for receiving and using a transmitter of the FMD or the SMD for sending such that messages sent by the transmitter of the FMD or the SMD can be received by the monitoring capability of the other of the FMD or the SMD,
      b1) wherein the exchanging challenge-response messages based on a chained secure challenge-response authentication protocol includes generating a response to a received challenge from the FMD to the SMD and sending the response as a new challenge for the FMD by the SMD based on the received challenge and vice versa,
      b2) wherein a time is measured between an emission of a challenge and a reception of a response to the challenge by the FMD and the SMD,
      b3) wherein a first overall time is determined as a sum of all times measured by the FMD and a second overall time is determined as a sum of all times measured by the SMD,
      b4) wherein part of each message received by the FMD and the SMD is extracted,
      b5) wherein each part extracted by the FMD is verified,
      b6) wherein the parts extracted by the SMD are cumulated and the cumulated parts are verified by the SMD after all messages have been exchanged with information of a cryptographic one-way function provided by the FMD to the SMD, b7) wherein the first overall time and the second overall time are compared with predetermined correct overall times, and b8) wherein authentication fails if the result of at least one of the steps b5)-b7) is negative;

c) measuring a relative position of the successfully authenticated FMD and the successfully authenticated SMD to each other;

d) performing steps a)-c) for each of the plurality of monitoring devices until relative positions of all of the plurality of monitoring devices to each other have been measured or until an authentication has been failed;

e) determining absolute positions of all of the plurality of monitoring devices using two supervised monitoring devices; and f) verifying the positions by matching the determined absolute positions with the corresponding stored predetermined correct absolute positions.

2. The method according to claim 1, wherein if an authentication according to step b8) fails an alarm is raised.

3. The method according to claim 1, wherein messages are exchanged via the transmitter and monitoring capability of the FMD or the SMD using optical communication, wherein the transmitter is adapted to modulate a visual signal.

4. The method according to claim 1, wherein exchanging challenge-response messages based on a chained secure challenge-response authentication protocol according to step b) is performed in a bit by bit manner.

5. The method according to claim 1, wherein prior to step b) a pre-agreed synchronization message is sent to the SMD by the FMD to trigger initiation of the authentication.

6. The method according to claim 1, wherein for performing step b) a random challenge nonce is generated and a commitment of the nonce is provided by the FMD to the SMD.

7. The method according to claim 6, wherein for performing step b) a first message comprising a result of a function computed by the FMD over a part of the nonce and a result of a cryptographic one way function over at least the security information and the commitment is sent to the SMD, wherein the parts of the nonce in different messages are different.

8. The method according to claim 7, wherein a second message is sent to the FMD by the SMD, the second message comprising a result of the function computed by the SMD over the received message and a result of a cryptographic one way function over at least the security information and the commitment.

9. The method according to claim 4, wherein the function is non-linear.

10. The method according to claim 4, wherein the nonce is divided into parts provided in a form of a plurality of bits, and wherein a number of messages exchanged during step b) corresponds to a number of parts of the nonce.

11. The method according to claim 9, wherein an expansion function is used for the parts of the nonce when used as input for the function.

12. The method according to claim 7, wherein in step b5) the FMD extracts the first message received in the second message by reverting the function and verifies the extracted first message.

13. The method according to claim 7, wherein in step b6) the parts extracted by the SMD are concatenated by the SMD and used as input for the cryptographic one way function, a result of which is compared with the commitment provided by the FMD to the SMD.

14. The method according to claim 1, wherein the correct times are calculated at least based on a correct distance between two monitoring devices and their processing capabilities for receiving, processing, and emitting a response to a received message.

15. A system for verifying positions of a plurality of monitoring devices, wherein a first number of monitoring devices out of the plurality of monitoring devices is supervised, wherein the plurality of monitoring devices are positioned such that each monitoring device of the plurality of monitoring devices can be monitored by at least one other monitoring device of the plurality of monitoring devices, wherein correct positions of the plurality of monitoring devices have been determined and stored prior to verification, and wherein security information for secure communication has been exchanged between two of the plurality of monitoring devices for all of the plurality of monitoring devices, the system comprising:

a) a first monitoring device (FMD) configured to select a second monitoring device (SMD) within a maximum monitoring range of the FMD, b) wherein the FMD and the SMD are configured to mutually authenticate each other by exchanging challenge-response messages based on a chained secure challenge-response authentication protocol between themselves using a monitoring capability of the FMD or the SMD for receiving and using a transmitter of the FMD or the SMD for sending such that messages sent by the transmitter of the FMD or the SMD can be received by the monitoring capability of the other of the FMD or the SMD, b1) wherein the exchanging challenge-response messages based on a chained secure challenge-response authentication protocol includes generating a response to a received challenge from the FMD to the SMD and sending the response as a new challenge for the FMD by the SMD based on the received challenge and vice versa, b2) wherein the FMD and the SMD are configured to measure a time between an emission of a challenge and a reception of a response to the challenge, b3) wherein the FMD is configured to determine a first overall time as a sum of all times measured by the FMD and the SMD is configured to determine a second overall time as a sum of all times measured by the SMD, b4) wherein the FMD is configured to extract part of each message received by the FMD and the SMD is configured to extract part of each message received by the SMD, b5) wherein the FMD is configured to verify each part extracted by the FMD, b6) wherein the SMD is configured to cumulate the parts extracted by the SMD and to verify the cumulated parts after all messages have been exchanged with information of a cryptographic one-way function provided by the FMD to the SMD, and wherein b7) wherein the FMD and the SMD respectively are configured to compare the first overall time and the second overall time respectively with predetermined correct overall times, and b8) wherein the FMD and the SMD are configured to determine a failed authentication if a result of at least one of b5)-b7) is negative;

c) wherein the successfully authenticated FMD and the successfully authenticated SMD are configured to measure a relative position to each other;

d) wherein each monitoring device is configured to perform steps a)-c) until relative positions of all of the plurality of monitoring devices to each other has been measured or until an authentication has been failed;
e) wherein two supervised monitoring devices are configured to determine absolute positions of all successfully authenticated monitoring devices; and,
f) wherein a verifier is configured to verify positions by matching the determined absolute positions with the corresponding stored predetermined correct absolute positions.

* * * * *